Jan. 7, 1941. B. F. PHILLIPS, JR 2,227,794
CANNING APPARATUS
Filed Feb. 24, 1939 2 Sheets-Sheet 1
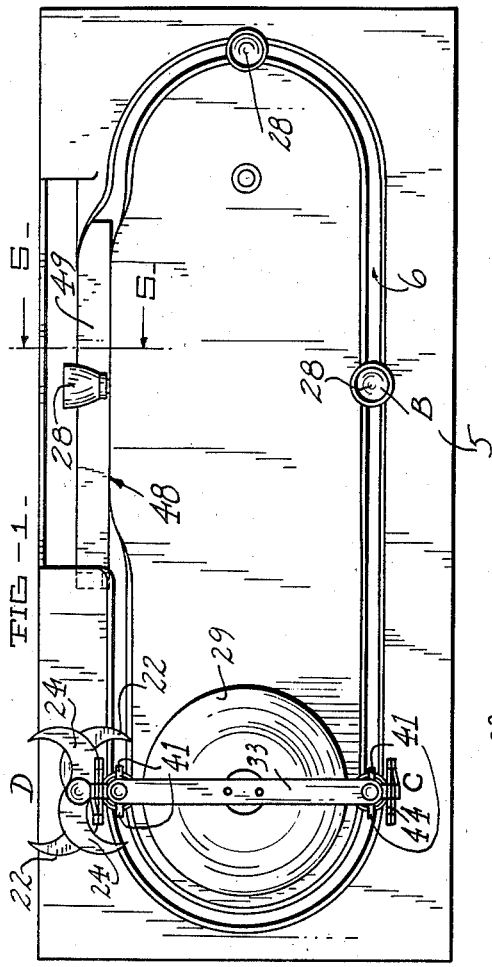
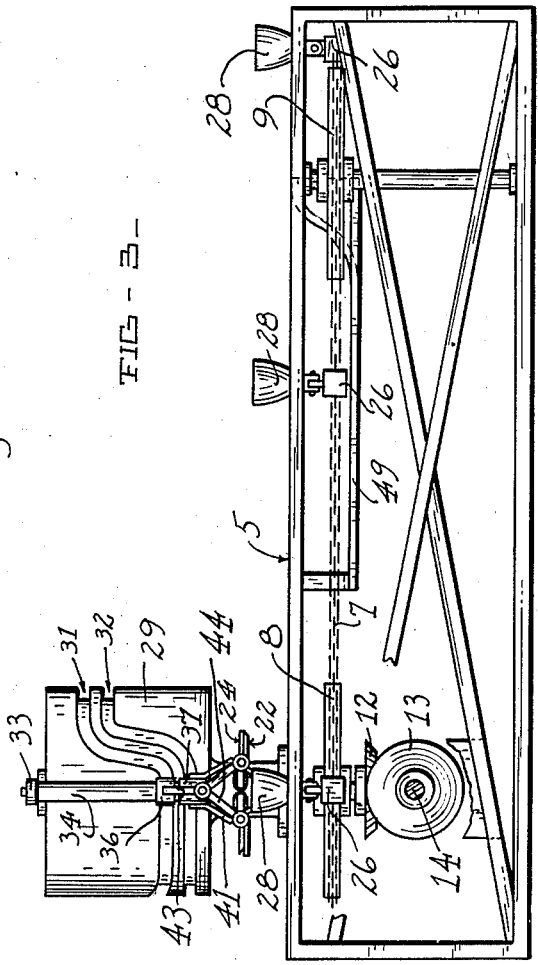
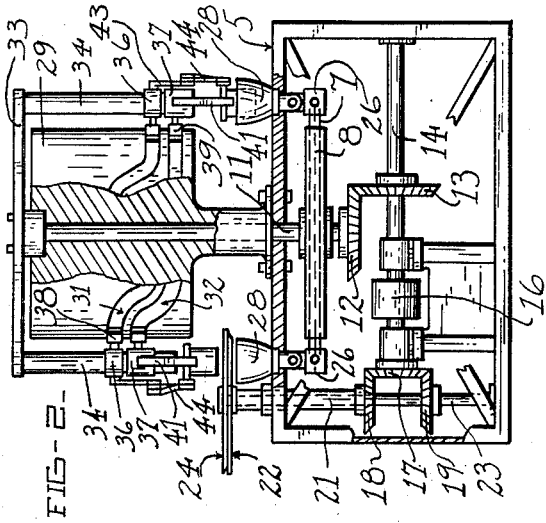
INVENTOR.
BENJAMIN F. PHILLIPS JR.
BY
ATTORNEYS

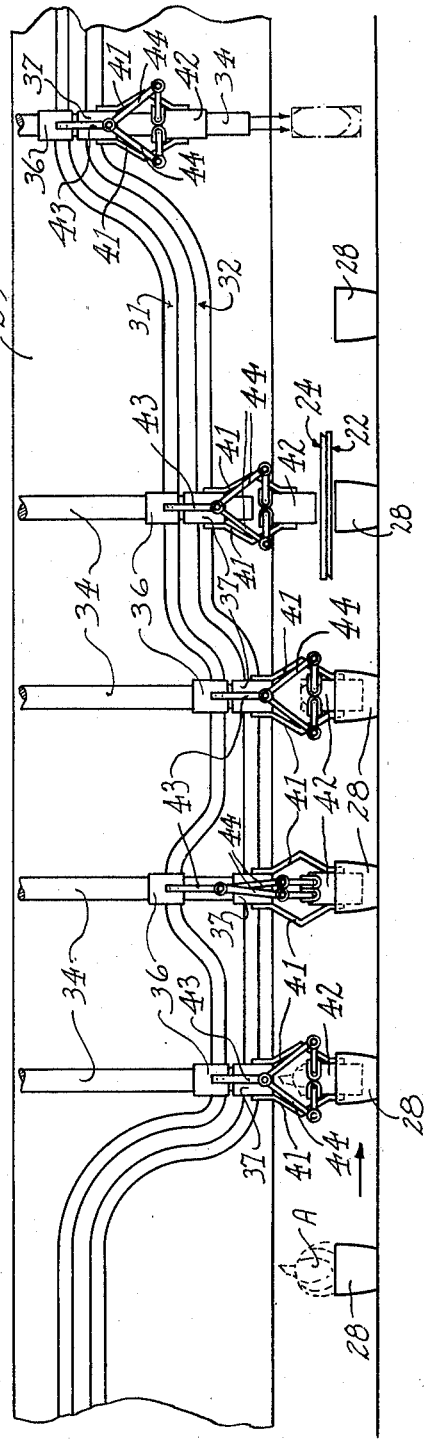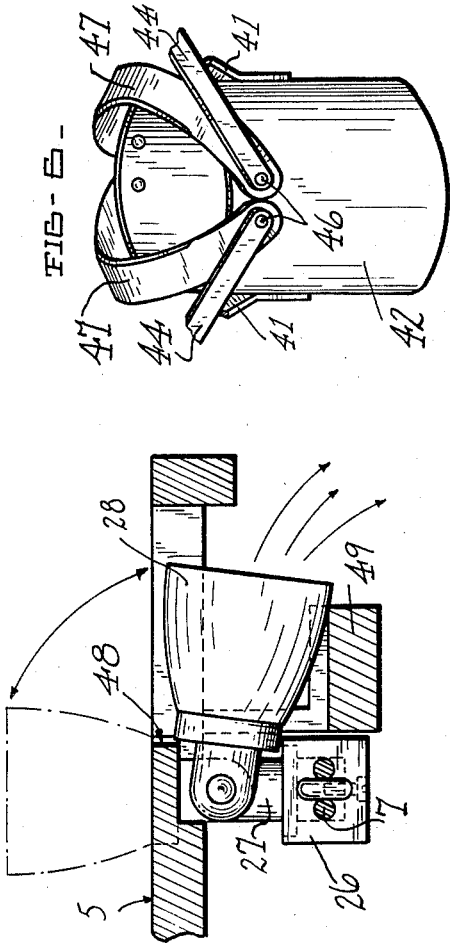

Patented Jan. 7, 1941

2,227,794

UNITED STATES PATENT OFFICE 2,227,794

CANNING APPARATUS

Benjamin F. Phillips, Jr., Planada, Calif.

Application February 24, 1939, Serial No. 258,286

2 Claims. (Cl. 146—52)

This invention relates to improvements in canning apparatus and has particular reference to the preparation of artichokes previous to placing the same in cans.

The principal object of this invention is to cut the heart from the artichoke, trim it at both ends, and deposit the same ready for canning.

A further object is to produce a device of this character which is economical to manufacture, one which can be easily cleaned and will, therefore, be sanitary, and a device which will not endanger the operator.

Other objects and advantages will be apparent during the course of the following description.

In the accompanying drawings forming a part of this specification and in which like numerals are employed to designate like parts throughout the same, Fig. 1 is a top plan view of my device;

Fig. 2 is an end elevation, showing a portion thereof broken away;

Fig. 3 is a side elevation of Fig. 1;

Fig. 4 is a diagrammatic view, showing the steps involved in the cutting operation;

Fig. 5 is an enlarged fragmentary detailed view taken on the line 5—5 of Fig. 1; and Fig. 6 is a perspective view of the cutters for severing the bottom of the artichoke.

An artichoke is an edible vegetable which grows upon a plant, and when picked therefrom has a heart portion surrounded by leaves and a protruding stem.

It is the object of my invention to remove the heart portion by cutting away therefrom the surrounding leaves, and to trim both ends of the artichoke so that only the edible heart portion remains. This I accomplish as will be noted by viewing the figures.

In the accompanying drawings wherein for the purpose of illustration is shown a preferred embodiment of my invention, it will be noted that in Fig. 1 I have shown a supporting table top 5 in which is a slotted trackway 6. Beneath this trackway is positioned a conveyor chain 7 which passes over wheels 8 and 9, suitably mounted and rotated beneath the table top. The wheel 8 is rotated through the medium of a shaft 11 having a gear 12 secured thereto and meshing with a driven gear 13 mounted upon a shaft 14. A pulley is shown at 16 over which a belt may be placed. It is obvious that any other form of driving the shaft 14 may be employed. This shaft 14 also carries a gear 17 which meshes with gears 18 and 19. The gear 18 is secured to a hollow shaft 21 extending through the table top and having crescent-shaped knife blades 22 secured thereto. The gear 19 is secured to a shaft 23 which extends upwardly through the hollow shaft 21 and has similar crescent-shaped knife blades 24 secured thereto. Therefore, when the shaft 14 revolves, the shafts 21 and 23 will rotate in opposite directions, thus moving the two sets of knives in opposite directions, the purpose of which will be later seen.

Attached to the chain 7 at intervals are blocks 26 having upstanding studs 27 to which are pivotally mounted receiving cups 28, which are adapted to receive the article headfirst, as illustrated in dotted lines at A in Fig. 4. Mounted at one end of the table is a cam drum 29 having cam slots 31 and 32 formed upon its outer surface. Extending through this drum is the shaft 11, upon the end of which is positioned an arm 33, from each end of which is suspended a guide rod 34. Upon this guide rod are sliders 36 and 37, the slider 36 having a roller 38 which travels in the cam slot 31. The slider 37 has a roller 39 which travels in the cam slot 32. Attached to the slider 37 are downwardly extending oppositely disposed braces 41 which serve to support at their lower ends a tubular cutter 42. Attached to the slider 36 is a downwardly extending arm 43 to which are secured toggle arms 44, pivoted as at 46 to the upper edge of the tubular cutter 42. Also pivotally secured to the upper end of this cutter are curved cutters 47, the purpose of which will be later seen.

By viewing Figs. 1 and 5 it will be noted that the trackway 6 has a portion thereof extended out of line, as shown at 48 and so cut away that the cup 28 will be tipped onto a riding bar 49 when the cup is pushed sideways by the extension 48. If desired, these cups 28 may be caused to rotate during their travel along the trackway by causing the same to bear against one side of the trackway so that a roller action will take place.

My device when assembled as shown will operate in the following manner:

The operator will place artichokes in the cups 28, as for instance, the cup B in Fig. 1, as the cup passes the operator. At that time, the artichoke will rest in the cup, as shown at A in Fig. 4. This cup will proceed toward the left of the machine until it reaches the point C in Fig. 1. At this time it will be directly beneath one of the guide rods 34 and its attached parts, it, of course, being understood that the timing between the travel of the chain and the rotation of the arms 33 has been properly adjusted. As the cup proceeds with the guide rod thereabove, the action will be that the rollers 38 and 39 will be moved downwardly in unison, as illustrated in the first full line position of Fig. 4. Consequently, the tubular cutter 42, which has a sharpened lower extremity, will cut through the artichoke, cutting the center therefrom. As the cup and guide rod move further, the roller 38 will move upwardly, drawing upon the toggle arms 44 in such a manner as to cause the cutters 47 to move about their pivotal points and trim off the bottom of the artichoke, leaving the same rounded.

As the device proceeds further to the third full line position illustrated in Fig. 4, the roller 38 will again move downwardly, opening the cutters. Shortly thereafter both rollers 38 and 39 will move upwardly, thus moving, of course, the sliders 36 and 37 upwardly to the fourth position, at which time the artichoke heart will be encased in the cutter 42 with a few of the top leaves or flowered ends protruding therefrom. At this time the guide rod 34 will have reached a point D (see Fig. 1) or, in other words, into a position where the oppositely rotating blades will pass beneath the tubular cutter 42 and cut off the protruding leaves.

As the machine moves further, the rollers and sliders will travel upwardly on the guide rod 34, which guide rod has a concave end which will push upon the rounded cut end of the artichoke in the tubular cutter 42 and eject the same therefrom into any convenient receptacle or chute.

The cup will now proceed along the trackway, and any refuse therein will be dumped therefrom, as illustrated in Fig. 5.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. In a device of the character described, a support, a trackway positioned on said support, means for moving article receiving cups along said trackway, a tubular cutter suspended above said trackway, cam means for moving said cutter into said cup to engage and cut a portion of the article therein, a pivoted cutter mounted to operate above the tubular cutter and adjacent thereto, a second cam means operating said pivoted cutter for severing a portion of said article extending above said tubular cutter, cam means for elevating said tubular cutter and the severed portion therein out of said cup, and cutters mounted in the path of movement of said tubular cutter and at a point therebelow, whereby a portion of said article extending below said tubular cutter will be severed.

2. In a trimming device of the character described, a supporting surface having a trackway formed therein, means for moving a plurality of cups along said trackway, each of said cups being adapted to hold therein an article having a core, a cutter mechanism associated with said trackway, means for moving said cutter mechanism into a cup to impinge upon an article positioned therein and cut out said core, means for raising said cutter and the core of said article out of said cup, means, while the core is in the cutter mechanism, for trimming the portion of the core above the cutter mechanism, and means for trimming the portion of the core below the cutter mechanism, while the core is in the latter.

BENJAMIN F. PHILLIPS, Jr.